May 5, 1953   R. BARRADELL-SMITH ET AL   2,637,167
APPARATUS FOR TRANSMITTING AND AMPLIFYING MOTION OF
A KNOWN FREQUENCY OF OSCILLATION AND SUPPRESSING
SUPERIMPOSED MOTIONS OF OTHER
FREQUENCIES OF OSCILLATION
Filed Sept. 1, 1951
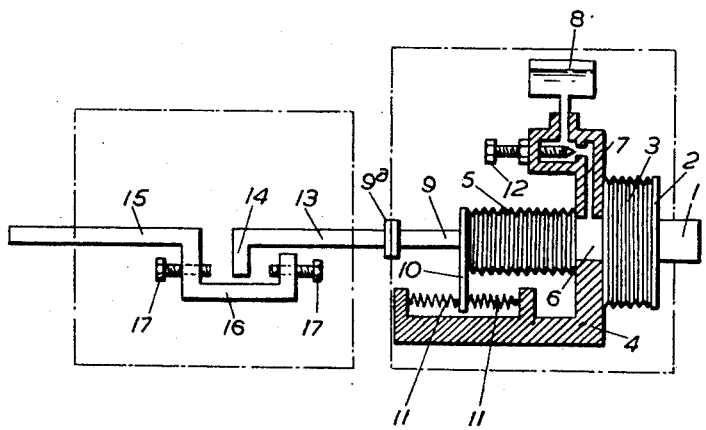
Richard Barradell-Smith
Richard Davison
Inventors
By
Morrison, Kennedy & Campbell,
Attorneys Patented May 5, 1953

2,637,167

UNITED STATES PATENT OFFICE 2,637,167

APPARATUS FOR TRANSMITTING AND AMPLIFYING MOTION OF A KNOWN FREQUENCY OF OSCILLATION AND SUPPRESSING SUPERIMPOSED MOTIONS OF OTHER FREQUENCIES OF OSCILLATION

Richard Barradell-Smith and Richard Davison, St. Helens, England, assignors to Pilkington Brothers Limited, Liverpool, Lancaster County, England, a corporation of Great Britain Application September 1, 1951, Serial No. 244,833
In Great Britain August 11, 1951

7 Claims. (Cl. 60—54.5)

This invention relates to apparatus for transmitting and amplifying motion of a known frequency of oscillation and suppressing superimposed motions of other frequencies of oscillation.

The main object of the present invention is to provide apparatus capable of transmitting slow motions which are difficult to transmit and filter by electrical means.

One particularly advantageous use of apparatus according to the invention is for transmitting the eccentric motion of a slowly rotating distorted or bowed roll while filtering out or suppressing slow changes due to alterations in position of bearings for the roll and suppressing high frequency vibrations due to roughness of the roll surface and vibration in the roll drive. Such conditions sometimes occur with internally water-cooled casting rolls rotating at a speed of one to ten revolutions per minute as used in continuous plate glass processes. It will, however, be understood that the apparatus may be employed for other purposes, for example it may be used to transmit the deflections of a railway bridge under traffic, suppressing the slow change of position caused by diurnal temperature changes and also the rapid vibrations due to the traffic wheels passing over the rail joints and the hammer-blows of the vertical out-of-balance forces of locomotives.

Apparatus for transmitting oscillatory motion of a desired frequency and for filtering out oscillatory motions of higher and lower frequency according to the present invention comprises a first and a second viscous liquid filled resilient bellows connected by a similarly filled conduit forming a fluid link therebetween, a power take-off member secured to said first bellows, and the outer end of the other bellows being coupled to a transmission element through a lost motion device, the bleed being adjustable to absorb oscillatory motions of frequencies below the desired frequency and the lost motion device being adjustable to absorb oscillatory motions of much higher frequencies than the desired frequency and of substantially constant amplitude, the outer end of said second bellows being spring balanced into a neutral position and coupled to the transmitting element.

In order that the invention may be more clearly understood one embodiment thereof will now be described, by way of example, with reference to the accompanying diagrammatic drawing.

Referring to the drawing, the compensating motion transmitter comprises a frequency-filtering motion-transmitter having a power take-off member 1 to receive a composite motion consisting of a known minimum, intermediate and maximum frequency of oscillation. The power take-off member is secured to the outer end 2 of a first cylindrical resilient bellows 3 of which the inner end is secured to one side of a mounting 4 having the inner end of a second cylindrical resilient bellows 5 secured to the opposite side thereof. A bore or conduit 6 coaxial with the longitudinal axes of the two resilient bellows extends through the mounting so that communication is effected between the two bellows and a channel or secondary conduit 7 opens into and extends at right angles to the bore 6 and communicates with a liquid reservoir 8 subject to atmospheric pressure. The reservoir and the two resilient bellows contain an incompressible or viscous liquid such as oil and by selection of the ratio of the diameters of the two bellows any desired amplification of the movement of the power take-off member 1 can be imparted to an output member 9 secured to the outer end 10 of the second resilient bellows 5. The outer end of the second resilient bellows is retained in a neutral position by the provision of balance springs 11 disposed on opposite sides thereof.

The power take-off member, as mentioned above, is adapted to receive a composite motion consisting of known minimum, intermediate, and maximum frequencies of oscillation, and an adjustable bleed, formed for example by the channel 7 and an adjustable needle-valve 12, provides means whereby substantially all motion of frequencies less than the known intermediate frequency of oscillation is suppressed, because liquid moving to and fro with these frequencies can pass the bleed between the bellows and the reservoir. As a result of this construction the output member 9 of the frequency-filtering motion-transmitter transmits an amplified composite motion consisting of frequencies of oscillation including and greater than the known intermediate frequency up to and including the maximum frequency.

It is, however, desired ultimately only to transmit an amplified motion of the known intermediate frequency of oscillation. In order to suppress or absorb oscillation motions of much higher frequencies than the known intermediate frequency and which are of substantially constant amplitude there is provided in combination with the frequency-filtering motion-transmitter an actuator 13 which is movable with the output member 9. The actuator comprises a rod coupled (as indicated at 9a) to and co-axial with the output member as an extension thereof, the rod having a projection 14 extending at right-angles to the axis of the rod. This projection is disposed for co-operation with a transmission element 15 and to this end is coupled therewith through a lost-motion device.

The lost-motion device comprises an extension to the transmission element, the axis of which is coincident with the axes of the actuator 13 and the output member 9 of the frequency-filtering motion-transmitter. The extension comprises a U-shaped member 16 integral with the transmission element 15, the parallel limbs of the U being disposed at right-angles to the axis of the transmission element 15. The projection 14 extending from the actuator 13 is located between the limbs of the U-shaped member 16, and each of the parallel limbs of the U-shaped member is provided with an adjustable screw 17. The extent of movement of the projection 14 between the screws before movement of the actuator 13 is imparted to the transmission element 15 is governed by suitably setting the screws 17.

By setting the screws 17 that part of the composite motion of the actuator which is represented by frequencies much higher than the aforementioned intermediate frequency of oscillation and which are of substantially constant amplitude can be suppressed so that the motion transmitted by the actuator 13 to the transmission element 15 is an amplified motion resulting from the intermediate frequency of oscillation applied to the power take off member of the frequency-filtering motion-transmitter.

We claim:

1. For transmitting oscillatory motion of a desired frequency and for filtering out oscillatory motions of higher and lower frequencies, apparatus comprising a first viscous liquid filled resilient bellows, a second viscous liquid filled bellows, a viscous liquid filled conduit forming a fluid link between said first and second bellows, a power take-off member secured to said first bellows, balance springs coupled to said second bellows to urge it to a neutral position, a transmission element to transmit said motion of desired frequency, an adjustable bleed from said conduit to absorb oscillatory motions of frequencies below the desired frequency, and an adjustable lost-motion device coupling said second bellows and transmission element to absorb oscillatory motions of substantially constant amplitude and of much higher frequency than the desired frequency.

2. For transmitting oscillatory motion of a desired frequency and for filtering out oscillatory motions of higher and lower frequencies, apparatus comprising a first viscous liquid filled cylindrical resilient bellows, a second viscous liquid filled bellows, a viscous liquid filled conduit forming a fluid link between said first and second bellows, a power take-off secured to said first bellows which latter is of greater diameter than that of the second bellows to amplify motion transmitted thereto, balance springs coupled to said second bellows to urge it to a neutral position, a transmission element to transmit said motion of desired frequency, an adjustable bleed from said conduit to absorb oscillatory motions of frequencies below the desired frequency, and an adjustable lost-motion device coupling said second bellows and transmission element to absorb oscillatory motions of substantially constant amplitude and of much higher frequency than the desired frequency.

3. For transmitting oscillatory motion of a desired frequency and for filtering out oscillatory motions of higher and lower frequencies, apparatus comprising a first viscous liquid filled cylindrical resilient bellows, a second viscous liquid filled bellows, a viscous liquid filled conduit forming a fluid link between said first and second bellows, a power take-off member secured to said first bellows which latter is of greater diameter than that of the second bellows to amplify motion transmitted thereto, balance springs coupled to the second bellows to urge it to a neutral position, a transmission element to transmit said motion of desired frequency, a viscous liquid containing reservoir, an adjustable bleed between said conduit and reservoir to absorb oscillatory motions of frequencies below the desired frequency, and an adjustable lost-motion device coupling said second bellows and transmission element to absorb oscillatory motions of substantially constant amplitude and of much higher frequency than the desired frequency.

4. For transmitting oscillatory motion of a desired frequency and for filtering out oscillatory motions of higher and lower frequencies, apparatus comprising a first viscous liquid filled cylindrical resilient bellows, a second viscous liquid filled bellows, a viscous liquid filled conduit forming a fluid link between said first and second bellows, a power-take-off member secured to said first bellows which latter is of greater diameter than that of the second bellows to amplify motion transmitted thereto, balance springs coupled to the second bellows to urge it to a neutral position, a transmission element to transmit said motion of desired frequency, a viscous liquid containing reservoir, an adjustable bleed between said conduit and reservoir to absorb oscillatory motion of frequencies below the desired frequency, said bleed including a secondary liquid filled conduit forming a fluid link between said first mentioned conduit and the reservoir and a needle-valve co-operating with said secondary conduit, and an adjustable lost-motion device coupling said second bellows and transmission element to absorb oscillatory motions of substantially constant amplitude and of much higher frequency than the desired frequency.

5. For transmitting oscillatory motion of a desired frequency and for filtering out oscillatory motions of higher and lower frequencies, apparatus comprising a first viscous liquid filled cylindrical resilient bellows, a second viscous liquid filled bellows, a viscous liquid filled conduit forming a fluid link between said first and second bellows, a power take-off member secured to said first bellows which latter is of greater diameter than that of the second bellows to amplify motion transmitted thereto, balance springs coupled to the second bellows to urge it to a neutral position, a transmission element to transmit said motion of desired frequency, a viscous liquid containing reservoir, an adjustable bleed between said conduit and reservoir to absorb oscillatory motions of frequencies below the desired frequency, and an adjustable lost-motion device coupling said second bellows and transmission element to absorb oscillatory motions of substantially constant amplitude and of much higher frequency than the desired frequency, said lost-motion device including an output member movable with the second bellows, a U-shaped extension movable with the transmission element, opposed adjustable setting members extending towards each other through the limbs of said U-shaped extension, and a projection movable with said ouptut member and located between said setting members.

6. For transmitting oscillatory motion of a desired frequency and for filtering out oscillatory motions of higher and lower frequencies, apparatus comprising a first viscous liquid filled cylindrical resilient bellows, a second viscous liquid filled bellows, a viscous liquid filled conduit forming a fluid link between said first and second bellows, a power take-off member secured to said first bellows which latter is of greater diameter than that of the second bellows to amplify motion transmitted thereto, balance springs coupled to the second bellows to urge it to a neutral position, a transmission element to transmit said motion of desired frequency, a viscous liquid containing reservoir, an adjustable bleed between said conduit reservoir to absorb oscillatory motion of frequencies below the desired frequency, said bleed including a secondary liquid filled conduit forming a fluid link between said first mentioned conduit and the reservoir and a needle-valve co-operating with said secondary conduit, and an adjustable lost-motion device coupling said second bellows and transmission element to absorb oscillatory motions of substantially constant amplitude and of much higher frequency than the desired frequency, said lost-motion device including an output member movable with the second bellows, a U-shaped extension movable with the transmission element, opposed adjustable setting members extending towards each other through the limbs of said U-shaped extension, and a projection movable with said output member and located between said setting members.

7. For transmitting oscillatory motion of a desired frequency and for filtering out oscillatory motions of higher and lower frequencies, apparatus comprising a mounting, a first viscous liquid filled cylindrical resilient bellows secured to one end of the mounting, a second viscous liquid filled cylindrical resilient bellows secured to the opposite end of the mounting, a viscous liquid filled conduit extending through the mounting to communicate with the interior of each of said bellows and form a liquid link therebetween, a power take-off member secured to said first bellows which latter is of greater diameter than that of the second bellows to amplify motion transmitted thereto, balance springs coupled to the second bellows to urge it to a neutral position, a transmission element to transmit said motion of desired frequency, a viscous liquid containing reservoir, a second conduit forming a fluid link between said first mentioned conduit and the reservoir, a needle valve co-operating with said second conduit to control the rate of flow of liquid between said first mentioned conduit and the reservoir thereby to absorb oscillatory motions of frequencies below the desired frequency, and an adjustable lost-motion device coupling said second bellows and transmission element to absorb oscillatory motions of substantially constant amplitude and of much higher frequency than the desired frequency.

RICHARD BARRADELL-SMITH.
RICHARD DAVISON.

References Cited in the file of this patent

UNITED STATES PATENTS

| Number | Name | Date |
|---|---|---|
| 2,274,254 | Newton | Feb. 24, 1942 |

FOREIGN PATENTS

| Number | Country | Date |
|---|---|---|
| 127,676 | Great Britain | June 12, 1919 |
| 612,012 | Germany | Apr. 11, 1935 |